(12) United States Patent
Best et al.

(10) Patent No.: US 6,676,413 B1
(45) Date of Patent: Jan. 13, 2004

(54) METHOD AND SYSTEM FOR PREVENTING ILLITERACY IN SUBSTANTIALLY ALL MEMBERS OF A PREDETERMINED SET

(75) Inventors: Emery Randolph Best, Dallas, TX (US); Jeri A. Nowakowski, Plano, TX (US); Matthew Peter Hunter, Dallas, TX (US); Stephan Randal Black, Colleyville, TX (US)

(73) Assignee: Voyager Expanded Learning, Inc., Dallas, TX (US)

( * ) Notice: Subject to any disclaimer, the term of this patent is extended or adjusted under 35 U.S.C. 154(b) by 114 days.

(21) Appl. No.: 10/124,587

(22) Filed: Apr. 17, 2002

(51) Int. Cl.[7] .............................................. G09B 17/00
(52) U.S. Cl. ..................................................... 434/178
(58) Field of Search ................................ 434/156, 159, 434/167, 169, 178

(56) References Cited

U.S. PATENT DOCUMENTS

| | | | |
|---|---|---|---|
| 5,059,127 A | 10/1991 | Lewis et al. ................ 434/353 |
| 6,017,219 A | 1/2000 | Adams, Jr. et al. ......... 434/178 |
| 6,077,085 A | 6/2000 | Parry et al. ................ 434/322 |
| 6,144,838 A | 11/2000 | Sheehan ..................... 434/362 |
| 6,195,640 B1 | 2/2001 | Mullaly et al. ............. 704/260 |
| 6,299,452 B1 * | 10/2001 | Wasowicz et al. .......... 434/178 |

* cited by examiner

Primary Examiner—John Edmund Rovnak
(74) Attorney, Agent, or Firm—William N. Hulsey, III; Hulsey, Grether, Fortkort & Webster, LLP

(57) ABSTRACT

A method and system for preventing illiteracy and achieving grade-level literacy in substantially all members of a predetermined set of students is disclosed, including the steps of administering standardized oral fluency measures, recording the test results in a database, calculating a standardized predictive measure of literacy for each student, presenting a report for each student including recommendations of curriculum and instruction time, determining a schedule for each student for repeating the steps of the method during the school year. Aggregate reports show a summary of progress for all the students or for a subset of the students. Teachers are surveyed for information regarding their activities in implementing the method. Supervisors are also surveyed for information regarding their supervisory activities. Reports are prepared from the information collected on such teacher and supervisor surveys. Data entry screens and reports may be provided to teachers and supervisors over the Internet.

25 Claims, 24 Drawing Sheets

| Fluency Test | Literacy Indicators |
|---|---|
| Initial Sound Fluency<br>Phoneme Segmentation Fluency | Phonological Awareness |
| Nonsense Word Fluency | Alphabetic Principle |
| Reading Connected Text | Accuracy and Fluency with Connected Text |
| Letter-naming Fluency | Risk Indicator that acquisition of crucial skills may be difficult |

FIG. 2

Progress Monitoring

Phoneme Segmentation Fluency

Short Form Instructions

For more detailed instructions, see the VIP Manual.

**I will say a word. After I say it, you tell me all the sounds in the word. If I say *man*, you would say /m/ /a/ /n/. Let's try one. (1-second pause) Tell me the sounds in *sat*.**

| CORRECT RESPONSE:<br>If student says /s/ /a/ /t/, you say: | INCORRECT RESPONSE:<br>If student gives any other response, you say: |
|---|---|
| Very good. | The sounds in *sat* are /s/ /a/ /t/. It's your turn. Tell me the sounds in *sat*. |

OK. Here is your first word.

FIG. 3A

Progress Monitoring 1  Student Name_____

Phoneme Segmentation Fluency Record Sheet

| test | /t/ /e/ /s/ /t/ | make | /m/ /ai/ /k/ | _____ /7 |
|---|---|---|---|---|
| sight | /s/ /ie/ /t/ | do | /d/ /oo/ | _____ /5 |
| goose | /g/ /oo/ /s/ | got | /g/ /o/ /t/ | _____ /6 |
| team | /t/ /ea/ /m/ | phone | /f/ /oa/ /n/ | _____ /6 |
| race | /r/ /ai/ /s/ | bath | /b/ /a/ /th/ | _____ /6 |
| beast | /b/ /ea/ /s/ /t/ | tear | /t/ /ea/ /r/ | _____ /7 |
| splash | /s/ /p/ /l/ /a/ /sh/ | sad | /s/ /a/ /d/ | _____ /8 |
| hopped | /h/ /o/ /p/ /t/ | way | /w/ /ai/ | _____ /6 |
| wiped | /w/ /ie/ /p/ /t/ | light | /l/ /ie/ /t/ | _____ /7 |
| found | /f/ /ow/ /n/ /d/ | there | /TH/ /ai/ /r/ | _____ /7 |
| duck | /d/ /u/ /k/ | save | /s/ /ai/ /v/ | _____ /6 |
| been | /b/ /e/ /n/ | neck | /n/ /e/ /k/ | _____ /6 |

Total: _____

Notes:

FIG. 3B

|  | Benchmark Period 1 |  |  |
|---|---|---|---|
|  | Letter Naming Fluency | Nonsense Word Fluency | Phoneme Segmentation Fluency |
| Barker, Jonathan | 45 | 40 |  |
| Bingham, Roland | 85 | 38 |  |
| Blaylock, Ronald | 36 | 22 |  |
| Davis, Steve | 37 | | |
| Escalante, Juliette | 56 |  |  |
| Fitzgerald, Dante | 63 |  |  |
| Gonzales, Pablo | 4 |  |  |
| Hamilton, Nancy | 21 |  |  |
| Hall, Richard | 7 |  |  |
| Hamilton, Shanelle | 36 |  |  |

FIG. 4A

| Student | BENCHMARK PERIOD 1 | WEEK 1 | WEEK 2 | WEEK 3 | WEEK 4 | WEEK 5 | WEEK 6 |
|---|---|---|---|---|---|---|---|
| Appleton, Desarey | 8 | 22 | 25 | 26 | 33 |  |  |
| Battleby, Devin | 57 |  |  |  |  |  |  |
| Berch, Jessica | 68 |  |  |  |  |  |  |
| Damian, Del | 5 | 8 | 11 | 13 | 19 |  |  |
| Denton, Kyle | 78 |  |  |  |  |  |  |
| Dulus, Tanya | 6 | 12 | 15 | 18 | 22 |  |  |
| Ether, Austin | 46 |  |  |  |  |  |  |
| Faring, Melissa | 33 |  |  |  | 36 |  |  |
| Hunter, Christian | 23 |  |  |  | 31 |  |  |

FIG. 4B

Kindergarten

| Big Idea in Literacy | Range | Percentile Rank or Score | Struggling | Emerging | On Track |
|---|---|---|---|---|---|
| Benchmark One | | | | | |
| (1) Initial Sound Fluency — P.A. | 0-80 | Score | 0-5 | 6 to 10 | 11+ |
| (2) Letter Naming Fluency — Risk Ind. | 0-110 | Percentile | 0 to 20% | 21 to 39% | 40% and up |
| Benchmark Two | | | | | |
| (1) Initial Sound Fluency — P.A. | 0-80 | Score | 0-5 | 6 to 10 | 11+ |
| (2) Letter Naming Fluency — Risk Ind. | 0-110 | Percentile | 0 to 20% | 21 to 39% | 40% and up |
| Benchmark Three | | | | | |
| (1) Initial Sound Fluency — P.A. | 0-80 | Score | 0 to10 | 11 to 25 | 26+ |
| (2) Letter Naming Fluency — Risk Ind. | 0-110 | Percentile | 0 to 20% | 21 to 20% | 40% and up |
| (3) Phoneme Segmentation Fluency — P.A. | 0-90 | Score | 0 to10 | 11 to 34 | 35+ |
| Benchmark Four | | | | | |
| (1) Phoneme Segmentation Fluency — P.A. | 0-90 | Score | 0 to10 | 11 to 34 | 35+ |
| (2) Letter Naming Fluency — Risk Ind. | 0-110 | Percentile | 0 to 20% | 21 to 20% | 40% and up |
| (3) Nonsense Word Fluency — P.A. | 0-200 | Score | 0 to19 | 20 to 39 | 40+ |

FIG. 5A

First Grade

| Benchmark One | Big Idea in Literacy | Range | Percentile Rank or Score | Struggling | Emerging | On Track |
|---|---|---|---|---|---|---|
| (1) Phoneme Segmentation Fluency | P.A. | 0-90 | Score | 0 To 10 | 11 To 34 | 35+ |
| (2) Letter Naming Fluency | Risk Ind. | 0-110 | Percentile | 0 To 20% | 21 To 20% | 40% And Up |
| (3) Nonsense Word Fluency | A.P. | 0-200 | Score | 0 To 19 | 20 To 39 | 40+ |
| Benchmark Two | | | | | | |
| (1) Phoneme Segmentation Fluency | P.A. | 0-90 | Score | 0 To 10 | 11 To 34 | 35+ |
| (2) Nonsense Word Fluency | A.P. | 0-200 | Score | 0 To 19 | 20 To 39 | 40+ |
| (3) Reading Connected Text 1 | A/F Text | 0-300 | Score | 0 To 19 | 20 To 39 | 40+ |
| Benchmark Three | | | | | | |
| (1) Nonsense Word Fluency | A.P. | 0-200 | Score | 0 To 19 | 20 To 39 | 40+ |
| (2) Phoneme Segmentation Fluency | P.A. | 0-90 | Score | 0 To 10 | 11 To 34 | 35+ |
| (3) Reading Connected Text 1 | A/F Text | 0-300 | Score | 0 To 19 | 20 To 39 | 40+ |
| Benchmark Four | | | | | | |
| (1) Reading Connected Text 1 | A/F Text | 0-300 | Score | 0 To 19 | 20 To 39 | 40+ |
| (2) Nonsense Word Fluency | A.P. | 0-200 | Score | 0 To 19 | 20 To 39 | 40+ |
| (3) Phoneme Segmentation Fluency | P.A. | 0-90 | Score | 0 To 10 | 11 To 34 | 35+ |

FIG. 5B

Second Grade

| | Big Idea in Literacy | Range | Percentile Rank or Score | Struggling | Emerging | On Track |
|---|---|---|---|---|---|---|
| Benchmark One | | | | | | |
| (1) Reading Connected Text 2 | A/F Text | 0-300 | Score | 0-19 | 20-39 | 40+ |
| (2) Nonsense Word Fluency* | A.P. | 0-200 | Score | 0 to 19 | 20 to 39 | 40+ |
| (3) Phoneme Segmentation Fluency | P.A. | 0-90 | Score | 0 to 10 | 11 to 34 | 35+ |
| Benchmark Two | | | | | | |
| (1) Reading Connected Text 2 | A/F Text | 0-300 | Score | 0 to 25 | 26 to 59 | 60+ |
| Benchmark Three | | | | | | |
| (1) Reading Connected Text 2 | A/F Text | 0-300 | Score | 0 to 30 | 31 to 69 | 70+ |
| Benchmark Four | | | | | | |
| (1) Reading Connected Text 2 | A/F Text | 0-300 | Score | 0-40 | 41-89 | 90+ |

Big Ideas in Literacy
P.A. = Phonological Awareness
A.P.= Alphabetic Principle
A/F Text=Accuracy and Fluency with Connected Text

FIG. 5C

Third Grade

| | Big Idea in Literacy | Range | Percentile Rank or Score | Struggling | Emerging | On Track |
|---|---|---|---|---|---|---|
| Benchmark One | | | | | | |
| (1) Reading Connected Text 3 | A/F Text | 0-300 | Score | 0 to 40 | 41-89 | 90+ |
| (2) Nonsense Word Fluency* | A.P. | 0-200 | Score | 0 to 19 | 20 to 39 | 40+ |
| (3) Phoneme Segmentation Fluency | P.A. | 0-90 | Score | 0 to 10 | 11 to 34 | 35+ |
| Benchmark Two | | | | | | |
| (1) Reading Connected Text 3 | A/F Text | 0-300 | Score | 0 to 40 | 41 to 94 | 95+ |
| Benchmark Three | | | | | | |
| (1) Reading Connected Text 3 | A/F Text | 0-300 | Score | 0 to 45 | 46 to 99 | 100+ |
| Benchmark Four | | | | | | |
| (1) Reading Connected Text 3 | A/F Text | 0-300 | Score | 0 to 70 | 71 to 109 | 110+ |

FIG. 5D

Class Reading Status
Campus1 - First Grade
Report accurate as of 03-25-2002 03:34

Mary Washington's First Grade Class

Benchmark Period 1
24 Students

| Student | Letter Naming Fluency SCORE | Risk Indicator Status | Nonsense Word Fluency SCORE | Struggling: 0-19 Emerging: 20-39 On Track: 40+ Status | Phoneme Segmentation Fluency SCORE | Struggling: 0-10 Emerging: 11-34 On Track: 35+ Status | Overall Status |
|---|---|---|---|---|---|---|---|
| Barker, Jonathan S | 45 | On Track | 22 | Emerging | 40 | On Track | On Track |
| Bingham, Roland | 65 | On Track | 72 | On Track | 38 | On Track | On Track |
| Blaylock, Ronald S | 36 | On Track | 30 | Emerging | 22 | Emerging | Emerging |
| Davis, Steve S | 37 | On Track | 25 | Emerging | 31 | Emerging | Emerging |
| Escalante, Juliette S | 56 | On Track | 22 | Emerging | 24 | Emerging | Emerging |
| Fitzgerald, Dante S | 63 | On Track | 44 | Emerging | 44 | On Track | On Track |
| Gonzales, Pablo S | 8 | Struggling | 2 | Struggling | 13 | Emerging | Emerging |
| Habelton, Nancy S | 21 | Struggling | 12 | Struggling | 38 | On Track | On Track |
| Hall, Richard S | 7 | Struggling | 1 | Struggling | 3 | Struggling | Struggling |
| Hamilton, Shanelle | 38 | On Track | 22 | Emerging | 33 | Emerging | Emerging |
| Hover, Eric S | 34 | On Track | 31 | Emerging | 28 | Emerging | Emerging |
| Jackson, William S | 38 | On Track | 27 | Emerging | 3 | Struggling | Emerging |
| Keaton, Stephana S | 33 | On Track | 18 | Struggling | 8 | Struggling | Struggling |
| Love, Reginald S | 44 | On Track | 31 | Emerging | 45 | On Track | On Track |
| Martin, Jose S | 25 | Emerging | 33 | Emerging | 37 | On Track | On Track |
| Narvaez, Sally S | 22 | Struggling | 5 | Struggling | 20 | Emerging | Emerging |
| Orlando, Buck S | 56 | On Track | 18 | Struggling | 22 | Emerging | Emerging |
| Rigley, Regina | 77 | On Track | 11 | Struggling | 41 | On Track | On Track |
| Sanchez, Emily S | 35 | On Track | 16 | Struggling | 17 | Emerging | Emerging |
| Silva, Sophie S | 63 | On Track | 47 | On Track | 39 | On Track | On Track |
| Smith, Mark S | 27 | Emerging | 23 | Emerging | 32 | Emerging | Emerging |
| Stannell, George S | 27 | Emerging | 29 | Emerging | 33 | Emerging | Emerging |
| Vasquez, Octavio S | 23 | Emerging | 15 | Struggling | 9 | Struggling | Struggling |
| Webster, Anand S | 26 | Emerging | 26 | Emerging | 7 | Struggling | Emerging |

FIG. 6A

Seacastles: Benchmark 1

Overall Reading Status is determined using Phonemic Segmentation Fluency and Nonsense Word Fluency as primary indicators. Letter Naming Fluency is factored in as an indicator of risk.

Struggling Reader
- Limit the struggling reader group to no more than six students for the daily Reading Sation lessons.
- Provide multiple opportunities for each child to respond
- Identify small groups of struggling readers and spend an additional 10-15 minutes using the Struggling Reader intervention component in Lessons 11-35.
- Administer PSF and NWF measures each week to monitor progress.
- Use Assessment Checkpoint 1 and observations from the NEF and PSF measures to identify specific difficulties. to address these difficulties
- Provide additional instruction for Phonological Awareness with problems of blending or segmenting, you may use:

-models: 3 and 4
   -games: 9 and 11
   *consult the index of essential reading skills for further suggestions*

•Provide additional instruction for Alphabetic Principle with specific letter sounds, you may use:

-Models: 2 and 5
   -Games: 10 and 1-8 (using the sound component)
   *Consult the index of Essential Reading Skills for further suggestions*

- Place struggling reader in the Voyager extended day program, *Beginnings*.
- Homestudy: Parents play one of the following games daily: Concentration Games, Slap the Letter Game, Grab Bag Game, and Alphabet I Spy Game. Ask parents to read with their student daily and to support their students participation in the Voyager extended day program, *Beginnings*.

Emerging Reader
For low scoring emerging readers (11-20 on PSF or 0-20 on NWF):

- Provide the Struggling Reader Intervention component of Lessons 11-35.
  - For all emerging readers:
    ○ Provide multiple opportunities for each child to respond.
    ○ Administer PSF and NWF measures once per month to monitor progress
    ○ Homestudy: Parents play one of the following games daily: Concentration Game, Slap the Letter Game, Grab Bag Game, and Alphabet I Spy Game. Ask parents to read with their student daily.

On Track Reader

- Maintain your current lesson implementation.
- Emphasize alphabetic principle skills.
- Homestudy: Ask parents to read with their student daily, listen to their child read, or use adventure related library books to challenge their reading

FIG. 6B

Seacastles: Benchmark 1

Overall Reading Status is determined using Phonemic Segmentation Fluency and Nonsense Word Fluency as primary indicators. Letter Naming Fluency is factored in as an indicator of risk.

Struggling Reader
- Limit the struggling reader group to no more than six students for the daily Reading Sation lessons.
- Provide multiple opportunities for each child to respond
- Identify small groups of struggling readers and spend an additional 10-15 minutes using the Struggling Reader intervention component in Lessons 11-35
- Administer PSF and NWF measures each week to monitor progress.
- Use Assessment Checkpoint 1 and observations from the NEF and PSF measures to identify specific difficulties. to address these difficulties
- Provide additional instruction for Phonological Awareness with problems of blending or segmenting, you may use:

-models: 3 and 4
    -games: 9 and 11
    *consult the index of essential reading skills for further suggestions*

• Provide additional instruction for Alphabetic Principle with specific letter sounds, you may use:

-Models: 2 and 5
    -Games: 10 and 1-8 (using the sound component)
    *Consult the index of Essential Reading Skills for further suggestions*

• Place struggling reader in the Voyager extended day program, *Beginnings*. Concentration Games, Slap the Letter Game, Grab Bag Game, and Alphabet I Spy Game. Ask
- Homestudy. Parents play one of the following games daily: Concentration Games, Slap the Letter Game, Grab Bag Game, and Alphabet I Spy Game. Ask parents to read with their student daily and to support their students participation in the Voyager extended day program, *Beginnings*.

Emerging Reader
For low scoring emerging readers (11-20 on PSF or 0-20 on NWF):

- Provide the Struggling Reader Intervention component of Lessons 11-35.
    • For all emerging readers:
        ○ Provide multiple opportunities for each child to respond.
        ○ Administer PSF and NWF measures once per month to monitor progress
        ○ Homestudy: Parents play one of the following games daily: Concentration Game, Slap the Letter Game, Grab Bag Game, and Alphabet I Spy Game. Ask parents to read with their student daily.

On Track Reader
- Maintain your current lesson implementation.
- Emphasize alphabetic principle skills.
- Homestudy: Ask parents to read with their student daily, listen to their child read, or use adventure related library books to challenge their reading

FIG. 8B

Summary Chart - School
CAMPUS2
JOSEPH CONRAD

Academic Year: 2001-2002
First Grade: 2 Classes 30 Students

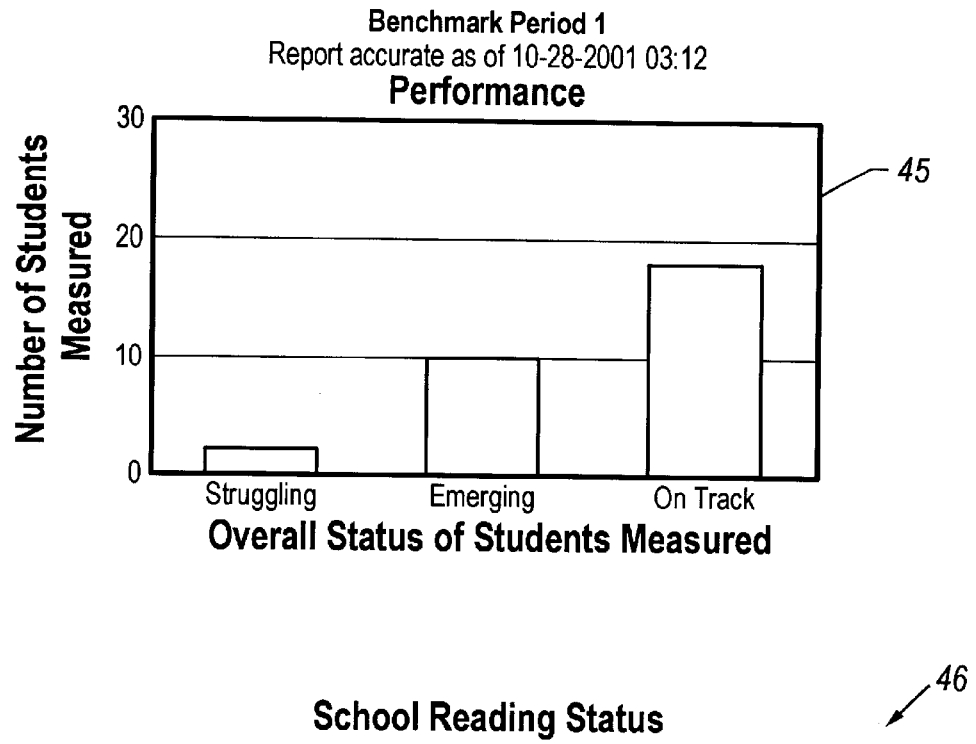

School Reading Status

| Classes | Struggling | Emerging | On Track | Students Measured | Total Students |
|---|---|---|---|---|---|
| Entire Class | 7% (2) | 33% (10) | 60% (18) | 30 | 30 |
| Class 1-first | 7% (1) | 47% (7) | 47% (7) | 15 | 15 |
| Class 2-first | 7% (1) | 20% (3) | 73% (11) | 15 | 15 |

The data above represents the overall status for your campus at Benchmark Period 1. Please consult the Class Reading Status report for instructions on how to support struggling, emerging, and established readers.
Finalization for First Grade: Benchmark Period 2 will occur on October 12th. Finalization for Kindergarten: Benchmark Period 1 will also occur on October 12th.

FIG. 9

Summary Chart - District
DISTRICT1
FRANCES CAPORELLO

Academic Year: 2001-2002
First Grade: 4 Classes 779 Students

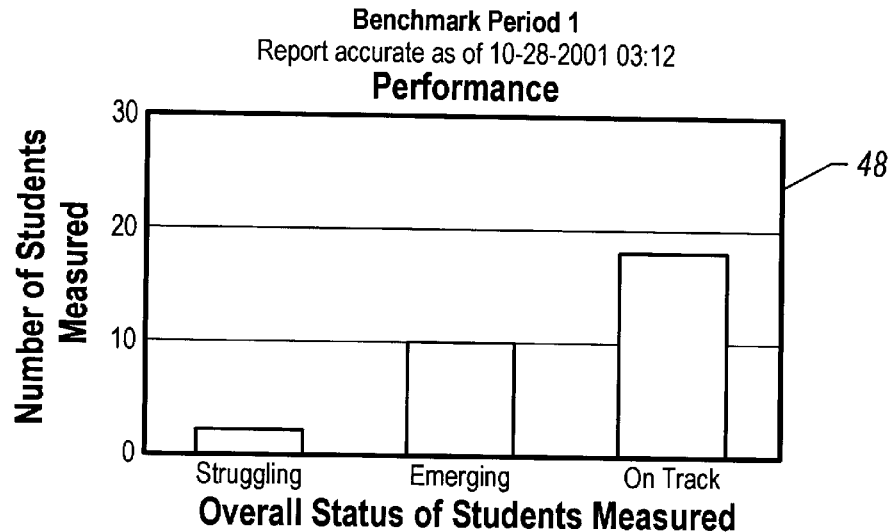

District Reading Status

| Schools | Struggling | Emerging | On Track | Students Measured | Total Students |
|---|---|---|---|---|---|
| Entire District | 13% (98) | 53% (413) | 34% (268) | 779 | 780 |
| Campus1 | 13% (92) | 54% (387) | 33% (240) | 719 | 720 |
| Campus2 | 7% (2) | 33% (10) | 60% (18) | 30 | 30 |
| Campus3 | 13% (4) | 53% (16) | 33% (10) | 30 | 30 |

The data above represents the overall status for your campus at Benchmark Period 1. Please consult the Class Reading Status report for instructions on how to support struggling, emerging, and established readers.
Finalization for First Grade: Benchmark Period 2 will occur on October 12th. Finalization for Kindergarten: Benchmark Period 1 will also occur on October 12th.

FIG. 10

Curriculum Implementation Survey

| Question | Answer | |
|---|---|---|
| 51 — 1) How useful were the professional development sessions you attended during the past 2 weeks? | Very Useful ▷ | |
| 52 — 2) During the last two weeks, my classroom was observed by: | Observer<br>Principal<br>Campus Reading Facilitator<br>Reading Specialist<br>Fellow Teacher | Time/Minutes<br>0 ▷<br>0 ▷<br>0 ▷<br>0 ▷ |
| 53 — 3) What unit, adventure, and lesson are you currently facilitating in your classroom? | Unit: 01 ▷<br>Adventure: 01 ▷<br>Lesson: 01 ▷<br>Assessment Checkpoint: 01 ▷ | |

Evaluate how the following curriculum components are going in your classroom:

Fine = No Support Needed
Uneven = Some Support Needed
Challenging = Would Like Support 4) Implement Reading Stations  Fine ▷
5) Use of the Curriculum Guide  Fine ▷
6) Learning Station Rotations  Fine ▷

54 — 7) Complete the Struggling Reader Checklist:

| Struggling Reader | Attending Beginnings | Time Attending Per Week | Completing Daily Reading Stations | Additional Support |
|---|---|---|---|---|
| Audra Laine | Yes ▷ | 0 ▷ | Yes ▷ | |
| John Smith | Yes ▷ | 0 ▷ | Yes ▷ | |
| Betty Smith | Yes ▷ | 0 ▷ | Yes ▷ | |
| Al B. Sure | Yes ▷ | 0 ▷ | Yes ▷ | |
| Betty White | Yes ▷ | 0 ▷ | Yes ▷ | |

FIG. 11

| Teacher | Visited Classroom | Reviewed SR Intervention Plan | Viewed Scorecard | Provided Additional Support | Attended Professional Development |
|---|---|---|---|---|---|
| Archie Bunker | Yes | Yes | Yes | Yes | 0 |
| Shannon Busch | Yes | Yes | Yes | Yes | 0 |
| Don Jones | Yes | Yes | Yes | Yes | 0 |
| Lanie Mann | Yes | Yes | Yes | Yes | 0 |
| Denise Trump | Yes | Yes | Yes | Yes | 0 |

FIG. 12A

Quality Assurance Checklist

Select 0 for NOT DOING IT if the teacher has yet to use that component of 100% Literacy.
Select 1 for PLANNING TO DO IT if the teacher has yet to use that component of 100% Literacy.
Select 2 for DOING IT WITH SOME SUCCESS if the teacher is using the component, though with less than total success
Select 3 for DOING IT EFFECTIVELY if the teacher is using the component with confidence and skill.

Teacher [____] ▷         Time Spent Observing [0] ▷

| CORE CURRICULUM | USE |
|---|---|
| 1) Teacher provides instruction in small same-ability groups in Reading Station. | [0] ▷ |

★ Teacher provides instruction that is targeted to group's learning level
★ Teacher teaches deliberately and persistantly
● Teacher leads students from the Learning Station to Reading Stations
● Students respond individually and as a group
● Teacher monitors student progress and checks for mastery
● Teacher varies size of group and length of instruction depending on students' needs

| 2) The Curriculum Guide is used consistently and appropriately | [0] ▷ |
|---|---|

★ Teacher closely follows daily lesson plan provided in Guide
★ Teacher uses models (from the Skill Development and Reading Station sections of Guide) with complete fidelity
● Teacher demonstrates familiarity with the day's lesson plan
● Teacher responds knowledgably to questions about the day's priority skills and the learning status of each student

| 3) Learning Stations are established and used as designed in the curriculum | [0] ▷ |
|---|---|

★ Students complete Learning Station activity(ies)
● Materials for stations are prepared in advance
● Students are mixed-ability grouped for Learning Stations

FIG. 12B

Welcome, Mary Washington
Here are your classroom Universal Literacy Vital Signs as of Mon Mar 25 18:34:23 CST 2002

ACTIVITIES — 57

| Action | Upcoming Milestones | Status |
|---|---|---|
| VIP Benchmark | Benchmark 2. Scores due by March 21, 2002 | 3 of 23 student scores recorded |
| Curriculum Implementation | Next survey due March 27, 2002 | Complete Survey |
| VIP Progress Monitoring | Weekly scores due March 15, 2002 | 3 of 6 struggling readers scores recorded |

Student Progress — 58

Curriculum Pacing — 59

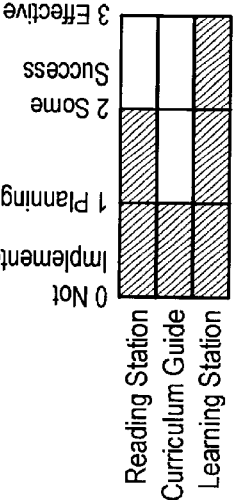

Instructional Fidelity — 60

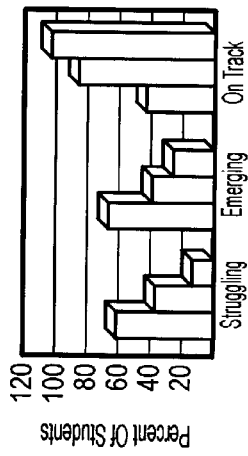

Professional development — 61
Attended 2 sessions
• Need support implementing reading stations
• Need some support with Learning Station Rotations

Struggling Reader Intervention — 62

| Struggling Reader | Attending Beginnings | Time Attending Per Week | Completing Daily Reading Stations | Additional Support |
|---|---|---|---|---|
| John Smith | Yes | 90 | Yes | N/A |
| Betty Smith | Yes | 90 | Yes | N/A |
| Al B. Sure | Yes | 60 | Yes | ESL |

FIG. 13

Instructional Fidelity —— 67

| Teacher | Visited Classroom | Visited Scorecard | Provided Additional Support | PD Attendance | Mini QAC |
|---|---|---|---|---|---|
| Archie Bunker | No | Yes | Yes | 0 | |
| Shannon Busch | No | No | No | 1 | |
| Don Jones | Yes | Yes | Yes | 2 | |
| Lanie Mann | Yes | Yes | No | 1 | |
| Denise Trump | Yes | Yes | Yes | 2 | |

Professional Development —— 68

Kindergarten
 On average teachers attended 2 sessions.

First Grade
 On average teachers attended 2 sessions.

Archie Bunker
- Requests support implementing Reading stations
- Requests some support with Learning Station Rotations

Don Jones
- Requests support with the use of the Curriculum

Struggling Reader Intervention —— 69

| Grade | Struggling Readers | Attending Beginnings | Time Attending Per Week Average | Completing Daily Reading Stations |
|---|---|---|---|---|
| Kindergarten | 83 | 72 | 56 min | 79 |
| 1st Grade | 64 | 84 | 45 min | 98 |
| 2nd Grade | 32 | 90 | 30 min | 120 |

FIG. 14B

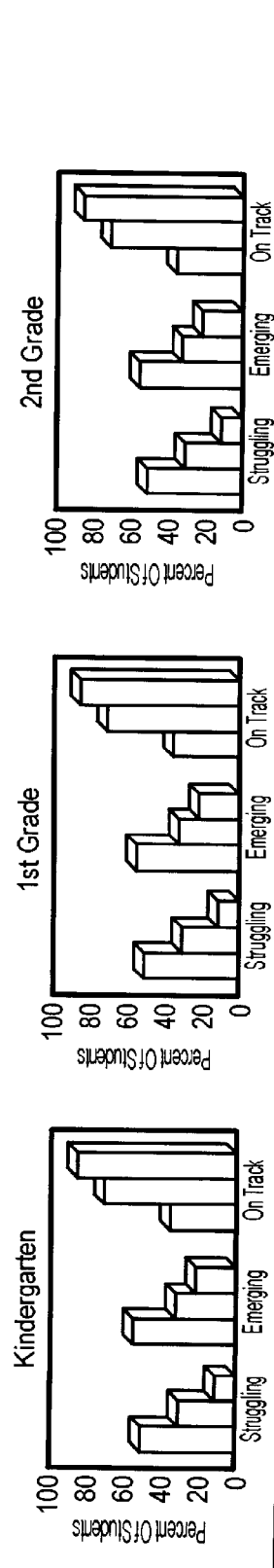
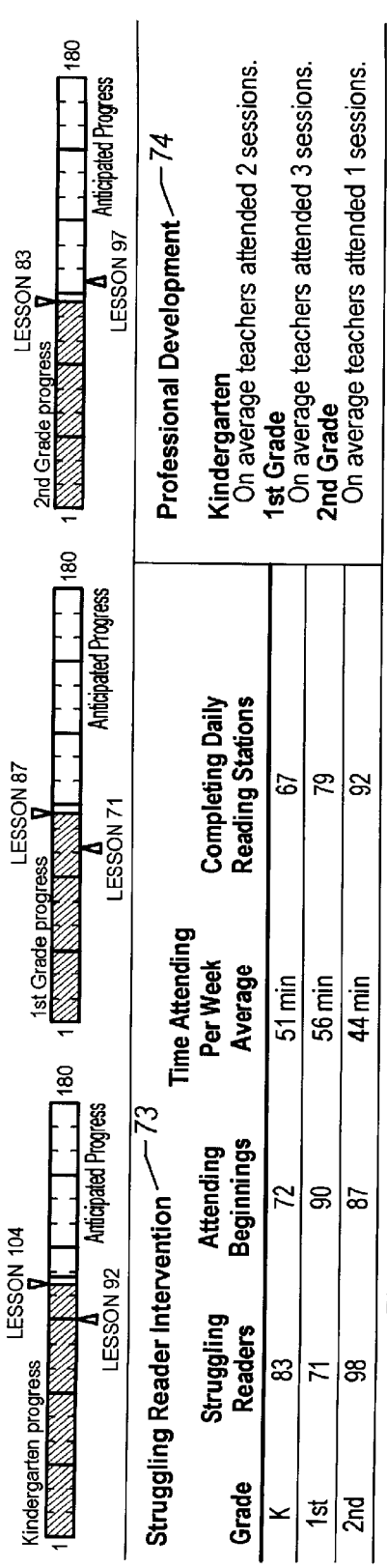
FIG. 15

METHOD AND SYSTEM FOR PREVENTING ILLITERACY IN SUBSTANTIALLY ALL MEMBERS OF A PREDETERMINED SET

BACKGROUND OF THE INVENTION

1. Field of the Invention

The invention relates to literacy programs. The invention is particularly, but not exclusively, useful for preventing illiteracy and achieving grade-level literacy in substantially all members of a predetermined set of students, such as those students in kindergarten through third grade (K-3).

2. Description of Related Art

In 1965 the National Institute of Child Health and Human Development (NICHD) initiated a research program on reading. A division of the National Institutes of Health, NICHD research focuses on protecting the health and welfare of our nation's children. They maintain the key factor in a child's health and well being is their education—particularly, and instrumentally, their ability to read in order to be successful in school and in life. Failure to read is associated with juvenile crime, teenage pregnancy, and dropping out of school. Illiteracy is as disabling to a child as any of the diseases against which we regularly inoculate.

Illiteracy is a social, economic, and health issue that affects children throughout our nation, but particularly impacts the poor. Only 14% of children from low-income families can read. These children will disproportionately end up unemployed and in prisons. 75% of unemployed adults are illiterate, 85% of juvenile offenders, and 60% of prison inmates. Illiteracy costs America over $250 billion a year.

While illiteracy is a costly American problem, it is not an inevitable one. Research over the past 30 years from NICHD proves that 95% of children can learn to read if taught early, deliberately, and effectively. The present system is explicitly built to achieve this 95% goal and designed as a primary prevention system to identify all children in a predetermined group at risk for reading failure, to provide each one immediate intervention, to monitor that intervention, and to continue the intervention until every child is on track to become a reader. The system is designed to find and remediate the problem of illiteracy at its origin—in the critical developmental years—and then to irradiate it. The ability to ensure all literacy-capable children in America can read through a primary prevention system constitutes an economic, social, and health safeguard of significant proportion.

Learning to read is the single most important factor determining a child's success in school and progress in life. Reading skills established in the first years of school enable students' success throughout school and afterwards.

Previous literacy programs utilized written tests to measure reading skills in students. Such tests are administered at the beginning and end of the school year. In some cases, the teachers whose students are being tested may devise tests. Commercial tests are administered and the results reported for tabulation. Some weeks or months later, the results are delivered to the teacher. This type of program presents statistical measures of the results of administering those tests, as a way of documenting the overall reading level of the tested students at two points in time. Reports are given on the performance of all students tested; individual results are reported normatively; i.e., compared to other students. Such programs do not provide specific recommendations for improving the skills of lower-performing students. Additionally, such programs are not repeated throughout the school year to monitor the progress of students toward grade-level literacy.

Previous literacy programs have reported on the reading skills of students, but they have not provided for reporting on the performance of teachers in the improvement of those reading skills. Those programs that provide general suggestions for remedial instruction activities for students do not collect information on the application of those suggestions, to allow administrators to evaluate the teachers, as well as the students.

Previous classroom management systems for monitoring the grades of students throughout the school year have provided spreadsheets to enter traditional letter grades (i.e., A, B, C, D and F) for individual students. These grades are from the tests administered by the teacher in the normal course of the school year. The grades are collected throughout the school year, and the grade history of individual students can give the individual progress of those students. However, because the tests are not standardized, the results collected by one teacher cannot be aggregated with the results from other teachers.

As such, many typical literacy programs and classroom management programs suffer one or more shortcomings. Many other problems and disadvantages of the prior art will become apparent to one skilled in the art after comparing such prior art with the present invention as described herein.

BRIEF SUMMARY OF THE INVENTION

The present invention provides one minute standardized oral fluency measures for determining the level of development of critical reading skills in individual students. These measures are 92% predictive of where a student will be at the end of the year absent intervention. Teachers can enter test results directly into the system and receive summary results immediately. The system may be made available over the Internet to teachers in any location. The oral fluency measures are repeated throughout the school year for lower-performing students, to allow monitoring of those students' progress toward grade-level literacy. Specific recommendations of curriculum and instruction time may be made for each student, based on the measured reading skills of that student. The test results for individual students may be aggregated to provide summary reports for all students in a classroom, a school or a school district.

More specifically, aspects of the invention may be found in a method and system for preventing illiteracy and achieving grade-level literacy in substantially all members of a predetermined set of students. The method contains the steps of administering standardized oral fluency measures to the students in the predetermined set of students. The results of those measures are recorded in a database and a standardized predictive measure of the current level of literacy of individual students is calculated. A report is presented for each student showing the student's recorded results; a calculated measure of literacy; and recommendations of curriculum and instruction time, based on the student's calculated measure of literacy. The report may also include a timeline plot of the student's results through the school year, showing his/her progress toward grade-level literacy, which may also be plotted on the timeline. A schedule is also determined for each student, also based on the student's calculated measure of literacy, for repeating the steps of the method during the school year, in order to achieve grade-level literacy in substantially all members of the predetermined set of students.

Aggregate reports may be prepared, showing a summary of the progress of all students in the predetermined set of students. Where the predetermined set of students is all students in a school district, aggregate reports may be prepared for a subset of students in the district: e.g., all students in a single classroom, all students at a given grade level within a school, all students within a school.

Teachers may be surveyed for information regarding their activities in implementing the method of the present invention, and a report presented on that information, including recommendations to improve the teacher's implementation of the method. Information regarding professional development activities may be collected and reported on. Activities may also be specified for the supervisors of the teachers, and surveys used to collect information about the performance of those activities by the supervisors. Reports can be prepared on the information collected on such supervisory activities and recommendations of supervisory activities to improve the implementation of the method. Data entry screens and reports may be provided to teachers and administrators over the Internet.

As such, a system and method for preventing illiteracy and achieving grade-level literacy in substantially all members of a predetermined set of students is described. Other aspects, advantages and novel features of the present invention will become apparent from the detailed description of the invention when considered in conjunction with the accompanying drawings.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein:

FIG. 2 is a table of fluency measures and the reading skills they test for;

FIG. 3A is an example of a teacher's instruction sheet for an oral fluency test;

FIG. 3B is an example of a worksheet for administering an oral fluency test;

FIG. 4A is an example of an oral fluency test results entry screen;

FIG. 4B is an example of a weekly progress test results entry screen;

FIGS. 5A, 5B, 5C and 5D are example tables used for calculating a standardized measure of literacy from test results;

FIG. 6A is an example report of individual student test results and calculated predictive measure of literacy FIG. 6B is an example report of recommendations of curriculum and instruction time;

FIG. 8B is an exemplary aggregated report of recommendations of curriculum and instruction time;

FIG. 9 is an exemplary aggregated report for a school;

FIG. 10 is an exemplary aggregated report for a school district;

FIG. 11 is an example of an implementation survey form;

FIGS. 12A and 12B are example supervisor survey forms;

FIG. 13 is an example of an implementation report;

FIGS. 14A and 14B illustrate an example of a school supervisor report;

FIG. 15 is an example of a district supervisor report;

DETAILED DESCRIPTION OF THE PREFERRED EMBODIMENTS

Figure 1:
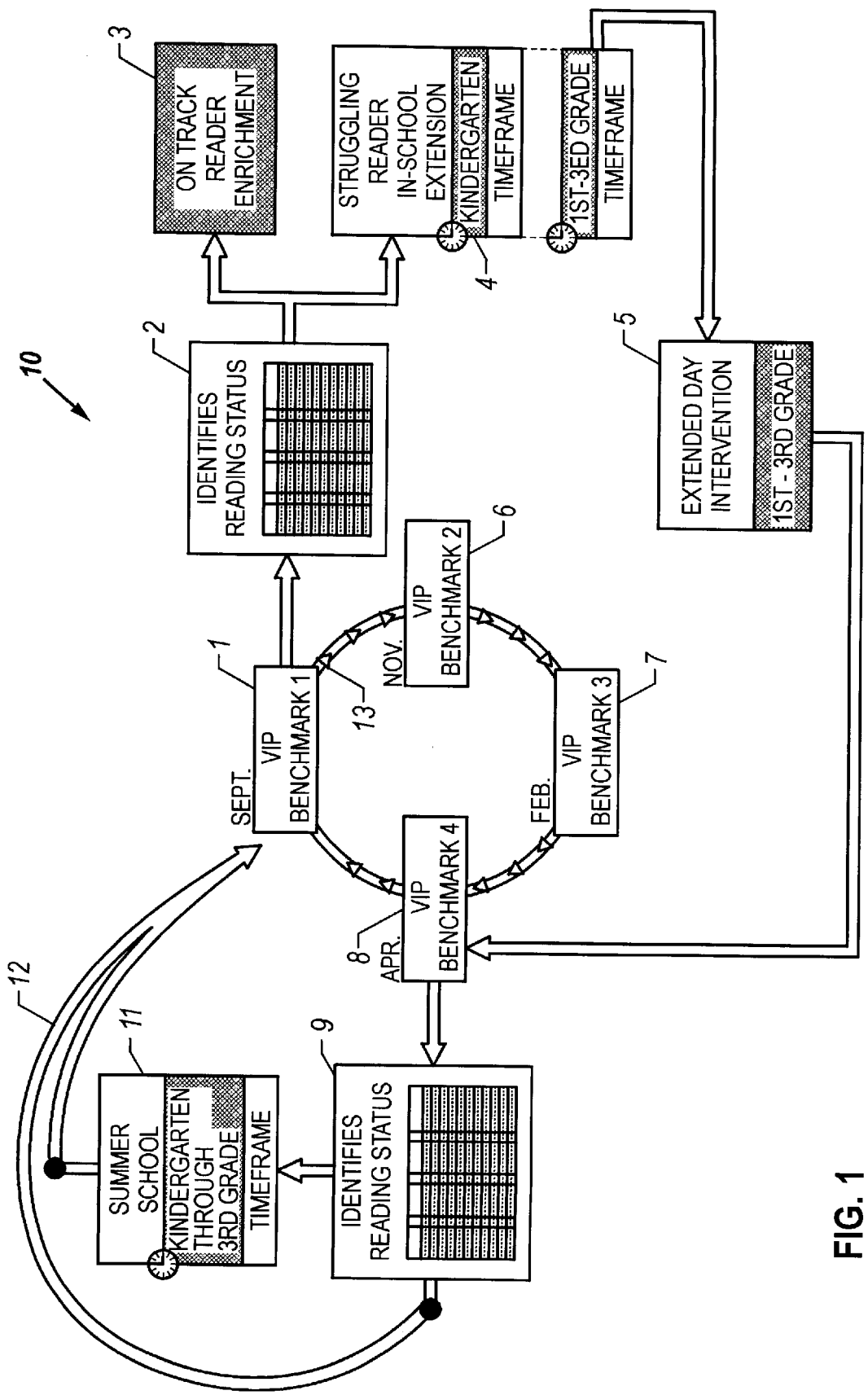
FIG. 1 is a flow chart of the method for preventing illiteracy and achieving grade-level literacy in substantially all members of a predetermined set of students.

Preferred embodiments of the present invention are illustrated in the Figures, like numerals being used to refer to like and corresponding parts of the various drawings. FIG. 1 depicts illiteracy prevention method 10, an embodiment of the present invention. The measures of benchmark period 1 are administered to kindergarten through third grade (K-3) students at the beginning of the school year to test their initial levels of literacy during each of these years. An initial predictive measure of literacy 2 is calculated from the results of those measures and used to make curriculum recommendations 3 for higher-performing readers. The initial measure of literacy is also used as the basis for extended instruction time recommendations 4 for lower-performing readers in kindergarten, and after-school instruction recommendations 5 for lower-performing readers in first grade. Weekly progress monitoring measures 13 are administered to lower-performing readers in the periods between benchmark periods. Additional benchmarks 6, 7 and 8 are administered at intervals throughout the school year. Based on the final benchmark 8, a final calculated predictive measure of literacy 9 is used to characterize the reading skills of the students at the end of the school year. Based on that final measure, summer school instruction recommendations 11 are made for lower-performing students, who receive extended instruction during the summer. Consequently, higher-and lower-performing students receive grade level promotions 12 and return to school the following year at the next grade level.

The benchmarks 1, 6, 7 and 8 and the weekly progress monitoring measures 13 include orally administered fluency measures. These measures assess critical reading skills that are predictive of a student's success in learning to read. The measures are brief and unobtrusive, requiring only about one minute to administer. A table of example fluency measures and the research-based, developmental literacy indicators for which they test are given in FIG. 2. For example, the Initial Sound Fluency and Phoneme Segmentation Fluency measures test for Phonological Awareness. The Nonsense Word Fluency test tests for Alphabetic Principles. FIGS. 3A and 3B illustrate one such oral fluency test, in this case the test for phoneme segmentation fluency. FIG. 3A depicts instructions and a script for the teacher to follow in administering the test. The teacher is given the script of a preparatory statement for the student, giving an example of a correct response and asking the student to respond to a practice word. The teacher is given samples of correct and incorrect responses to the practice word and scripts to use in reply to the student's response, correct or incorrect. FIG. 3B depicts a work sheet for administering a test to a single student. A series of test words 15 to be read to the student are listed, and the correct phoneme responses 16 for each test word are shown for the teacher's reference. Results of the test are entered into blanks 17 to record the student's performance on the test. In FIG. 3B, the results are the number of correct phonemes identified by the student out of the total number of phonemes presented by the test words. The results are totaled and entered into blank 18 for a single total score on the test.

Multiple oral fluency measures are administered as part of the benchmarks given throughout the school year, and FIG. 4A illustrates the entry of those test scores for one benchmark into the database of an embodiment of the illiteracy prevention method. Test scores from each of the oral fluency measures are entered for each of the students in the class. In FIG. 4A, the fluency measures making up Benchmark 1 for first grade are Letter Naming Fluency, Nonsense Word Fluency, and Phoneme Segmentation Fluency. As indicated in the description of FIG. 1, lower-performing students are re-tested weekly to monitor their progress toward improved literacy. FIG. 4B depicts a screen used for the entry of the results of the weekly administration of the Nonsense Word Fluency test. The students' scores from the most recent Benchmark Period are displayed and weekly test results are entered for the lowest-performing readers. Medium-performing readers are re-tested monthly, rather than weekly, and the results of those measures also are entered using the screen depicted in FIG. 4B.

FIGS. 5A, 5B, 5C and 5D depict tables used for kindergarten, first, second and third grades, respectively, to calculate a measure of literacy from each of the oral fluency test results entered by the teacher. For each grade level 21, and for each benchmark period, of which benchmark 22 is an example, the table presents literacy indicators 23 identifying the reading skill tested by each of the oral fluency measures included in the benchmark, a range 24 of possible test results for each fluency test, the type of result 25 returned by each oral fluency test, and result ranges 26, 27 and 28 for identifying lower-, medium- and higher-performing readers. Examination of these result ranges will reveal that the test scores needed to remain at the same measured level of literacy rise, in expectation of improving literacy throughout the school year.

To illustrate the use of the tables of FIG. 5A, benchmark 22 is described in more detail. Benchmarks one, two, three and four for kindergarten students comprise two oral fluency measures: Initial Sound Fluency and Letter Naming Fluency. Benchmark three further comprises Phoneme Segmentation Fluency while Benchmark four further comprises Nonsense Word Fluency. Referring to literacy indicators 23, those fluency measures test for Phonological Awareness and provide a risk indicator for difficulty in acquiring crucial reading skills, respectively. The range 24 of scores achievable on the Initial Sound Fluency and Letter Naming Fluency measures is 0–80 and 0–110 respectively. Those result types 25 may be a raw score or a percentile, respectively. The result ranges 26, 27 and 28 provide a lookup table for calculating a measure of literacy from each of the fluency test scores. For the Initial Sound Fluency test, scores in the ranges 0–5, 6–10, and 11–80 are assigned literacy measures Struggling, Emerging, and On Track, respectively. For the Letter Naming Fluency risk indicator test, scores in the percentile ranges 0–20%, 21–39%, and 40–110% are assigned literacy measures Struggling, Emerging, and On Track, respectively. These two literacy measures are then weighted and combined to calculate a single measure of literacy, also in the categories Struggling, Emerging, and On Track. However, these ranges, categories and measures are one exemplary embodiment and others may be utilized. FIGS. 5B, 5C and 5D depict similar tables for the first, second and third grade respectively. The benchmarks provided for the First, Second and Third grades further comprise measures for Reading Connected Text for each grade level.

FIGS. 6A and 6B depict two parts of a class reading status report as presented by an embodiment of the present invention. In FIG. 6A, each student 31 is listed individually along with his or her fluency test results and literacy measures 32, 33 and 34, from, in this example, Benchmark Period 1. An overall predictive measure of literacy 35, calculated from the student's test results, is also presented for each student. FIG. 6B shows curriculum and instruction time recommendations for lower-performing (Struggling), medium-performing (Emerging) and higher-performing (On Track) students, as produced by an embodiment of the present invention. For example, recommendations are made for Struggling readers to spend additional instruction time on a specific Struggling Reader Intervention component in the curriculum, to administer Phoneme Segmentation Fluency and Nonsense Word Fluency measures weekly, and to use specific Models and Games from the curriculum. Recommendations are made for low-scoring Emerging readers to use a specific Struggling Reader Intervention component in the curriculum and to administer Phoneme Segmentation Fluency and Nonsense Word Fluency measures monthly.

A class reading status report such as that shown in FIGS. 6A and 6B would be used regularly throughout the school year by the teacher to monitor the literacy of the students and to adjust the students' curriculum and amount of instruction time, according to each student's level of literacy. Lower- and medium-performing students can be tested and evaluated regularly between Benchmarks, allowing timely, targeted instructional intervention to ensure their achievement of grade-level literacy.

Figure 7:
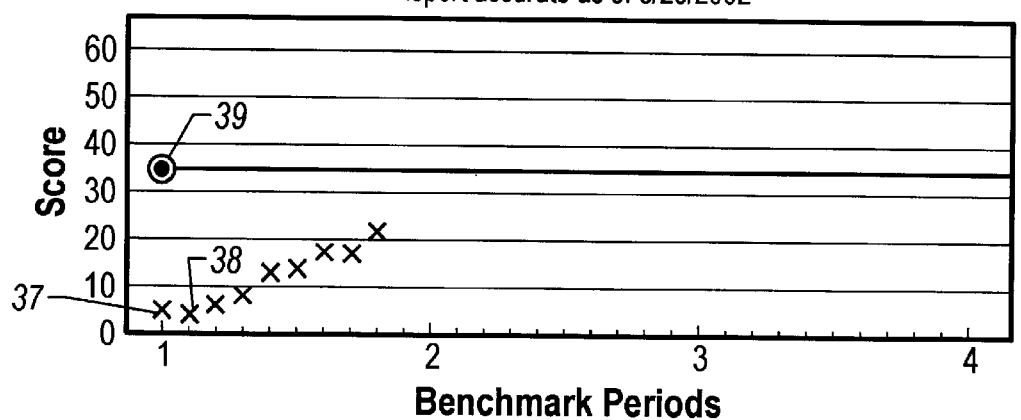
FIG. 7 is an example timeline plot of test results for a student, including an indication of a target score representing grade-level literacy.

FIG. 7 depicts a timeline plot of benchmark and weekly progress test results for an individual student for a single fluency test. Benchmark result 37 and weekly test results 38 are plotted on a timeline along with a grade level literacy target score 39, in order to show the student's progress toward grade level literacy. Such a graphical presentation of test scores assists the teacher to determine whether the student is making satisfactory progress toward grade level literacy.

Figure 8A:
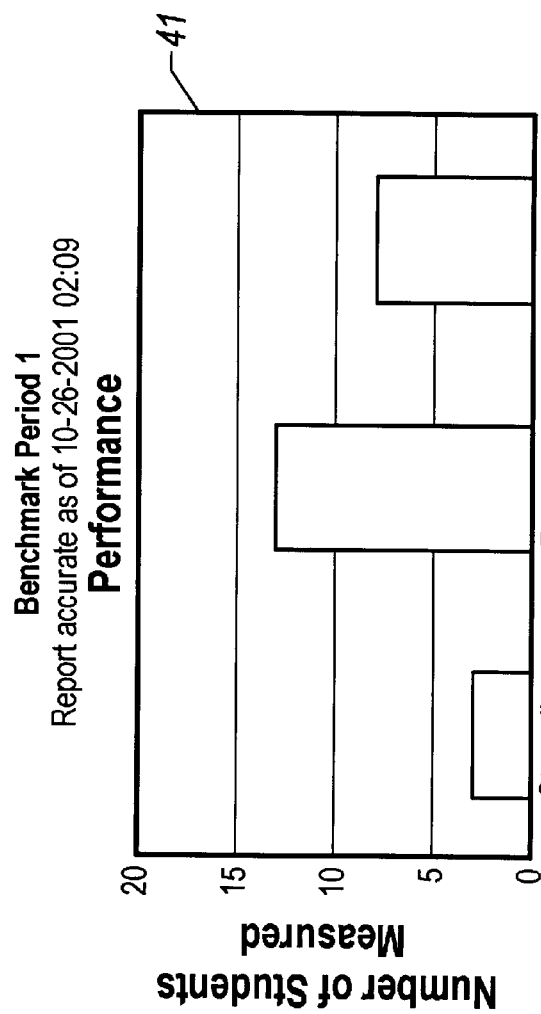
FIG. 8A is an exemplary aggregated report for a class.

FIGS. 8A and 8B illustrate a summary chart for the class of students reported on in FIGS. 6A and 6B. This report aggregates the calculated predictive measures of literacy for all students in the class and presents the results in FIG. 8A as a bar chart 41 graphically depicting the number of students at each level of literacy and as a table of numeric data 42, numerically presenting the same information as the bar chart 41. Recommendations 43 for curriculum and instruction time, as described for FIG. 6B, are also presented in this report, as shown in FIG. 8B.

Measured levels of literacy can also be aggregated for all students within a school. FIG. 9 depicts such an aggregate report. The report presents a bar chart 45 graphically depicting the number of students in the school at each level of literacy and a table of numeric data 46, numerically presenting the same information as the bar chart 45. Table 46 also presents aggregated numerical information on the number of students at each level of literacy in individual classes within the school.

A similar summary chart is presented in FIG. 10 for all students within a school district. Again, a bar chart 48 graphically depicting the number of students in the district at each level of literacy and a table of numeric data 49, numerically presenting the same information as the bar chart 48, are presented summarizing the performance of the students. Table 49 also presents aggregated numerical information on the number of students at each level of literacy in individual schools within the district.

Monitoring the implementation of the method can increase the efficacy of the illiteracy prevention method of the present invention. In order to monitor and improve the implementation of the method, teachers and administrators are surveyed for information regarding their activities in implementing the method. The information collected in these surveys can then be presented to teachers and administrators to permit them to improve their implementation of the illiteracy prevention method. Data from the students is correlated and analyzed with data from the teachers and administrators, and provided in aggregate reports to provide early signs of low student progress and poor implementation of the method. Aggregate data is reported, showing a summary of the progress of implementation of the method in the classrooms. A report is included that provides recommendations for each classroom to prevent illiteracy. Information on the pacing of the curriculum in each classroom is collected and presented. Information on the plans and actions for students who need additional instruction time and support is recorded and reported on. Information on the quality and fidelity of the implementation of the system are recorded and reported on. Recommendations are made to teachers for improving their implementation of the method.

FIG. 11 illustrates a teacher's survey as used in an embodiment of the present invention. The survey collects information regarding professional development activities by the teacher 51, such as the utility of professional development sessions attended. In this embodiment, pop-down menus are used to select an answer to the survey question, indicated in the figure by a box around the response and an inverted triangle next to the response box. Supervisory activities by administrative personnel 52 are also gathered by the form, for example, the number of observation visits received by the teacher from different categories of administrators. Further, information on implementation activities 53 by the teacher is sought, such as the elements of the curriculum currently being taught in the class and a self-assessment of the teacher's use of curriculum components. Information 54 on activities completed by lower-performing students is also collected on the form, for example, their attendance at extended instruction sessions and their completion of additional curriculum components.

FIGS. 12A and 12B depict forms for collecting information from supervisors of the implementers of the illiteracy prevention method. FIG. 12A collects information regarding the supervisor's recent activities in support of individual teachers: in this embodiment of the invention, that information includes whether the supervisor visited the teacher's classroom, reviewed the teacher's intervention plan for lower-performing or struggling readers, viewed the teacher's implementation report. The information collected in the supervisor's survey in this embodiment of the invention also includes a report by the supervisor of the teacher's attendance at professional development sessions. FIG. 12B illustrates a form for recording observations made by the supervisor while observing individual teachers in a classroom setting. In this embodiment, the observations recorded are of the teacher's use of the Reading Station, Curriculum Guide and Learning Station instructional components.

Once the survey information from FIGS. 11, 12A and 12B is entered into the database of an embodiment of the present invention, an implementation report such as that shown in FIG. 13 can be presented to the teacher. Included in this embodiment of such a report are a summary of implementation activities 57, such as administration of Benchmarks and weekly monitoring tests, and timely completion of the teacher survey form. Aggregated information on the students' calculated predictive measures of literacy 58 is also presented in the implementation report. Such aggregated information in this embodiment of the invention includes a bar chart depicting the number of students at each level of literacy in several recent Benchmark Periods, allowing the teacher to observe the increase or decrease of number of students at each level of literacy. A graphical presentation of the teacher's instructional pacing 59 is also presented, showing the amount of curriculum the teacher is expected to have completed by the date of the report, juxtaposed with the amount of curriculum the teacher has actually completed. Further, a graphical presentation 60 of a supervisor's assessment of the teacher's use of the instructional components recorded in the form from FIG. 12B is included in the implementation report, as an indicator of instructional fidelity. A summary of recent professional development activities 61 is presented. Additionally, information on remediation activities completed by each lower-performing student 62 is included in the implementation report, including the student's attendance at extended instruction time sessions, and the amount of time attending those sessions, and the student's completion of daily reading assignments.

Figure 14A:
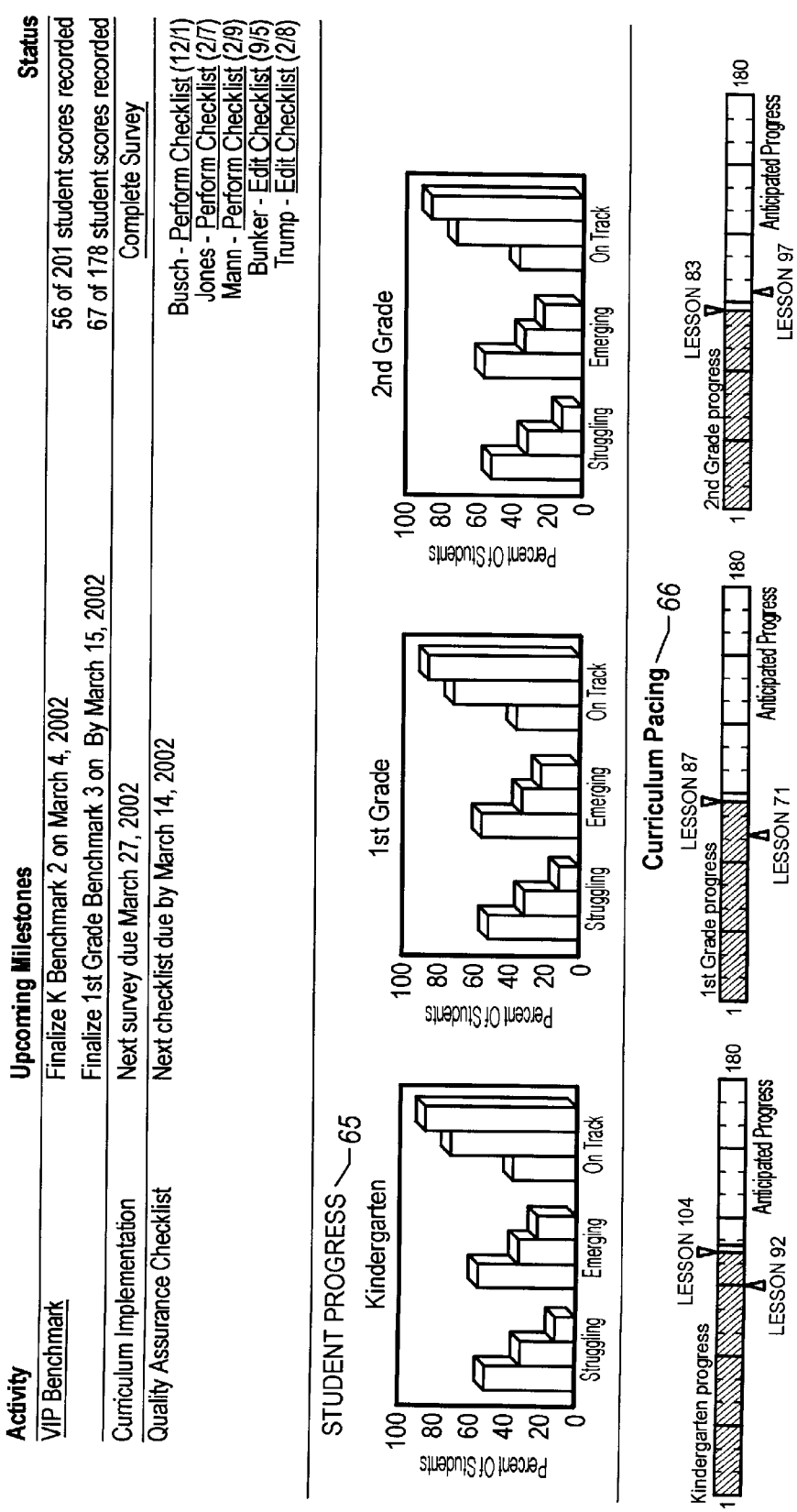

In this embodiment of the present invention, a report such as that shown in FIGS. 14A and 14B can be prepared for a supervisor at the school level. Turning to FIG. 14A, information presented in such a report in this embodiment of the invention includes a table of summarized implementation activities 64 for all classes and teachers in the school, including upcoming milestone deadlines and the degree of teachers' completion of milestones and of the supervisor's completion of the milestones. Aggregated student progress information 65 for each grade level in the school is also presented in the form of a bar chart depicting the number of students at each level of literacy in several recent Benchmark Periods, as described for FIG. 13. Aggregated instructional pacing information 66 is presented graphically in this embodiment of the invention, as described for the presentation of the teacher's instructional pacing 59 in FIG. 13. Turning to FIG. 14B, the report also includes instructional fidelity information 67, as reported by the supervisor in the survey forms of FIGS. 12A and 12B, for each teacher in the school. In order to clarify the results reported for a specific teacher, the supervisor can click on that teacher's name and review details of that teacher's class, for example, a report such as that shown in FIG. 13. Professional development information 68 is also presented, aggregated for each grade level and listing needs reported by individual teachers. Information 69 regarding remediation activities completed by lower-performing students is shown, aggregated by grade level, including the number of lower-performing students in each grade level, the number of students attending extended instruction time sessions, the average amount of time spent attending those sessions, and the number of students completing daily reading assignments.

FIG. 15 depicts a report for a district level supervisor, including aggregated student progress information 71 by grade level for all students in the school district, presented as described for aggregated student progress information 65 in FIG. 14A. Instructional pacing information 72 is aggregated for each grade level in the district and presented, in this embodiment of the invention, in the same format described for aggregated instructional pacing information 66 in FIG. 14A. Information 73 regarding remediation activities completed by lower-performing students in the district is shown, aggregated by grade level, including the number of lower-performing student in each grade level, the number of students attending extended instruction time sessions, the average amount of time spent attending those sessions, and the number of students completing daily reading assignments. Aggregated professional development information 74 for teachers at each grade level within the district is also presented, including the average number of professional development sessions attended. Additionally, a table of aggregated measures of literacy 75 is included, showing, in this embodiment of the invention, the number and percentage of students at each level of literacy at each school in the district. Details of performance at a specific school can be viewed by clicking on the school name, which brings up a report on that school, for example, a report such as that shown in FIGS. 14A & 14B.

Figure 16:
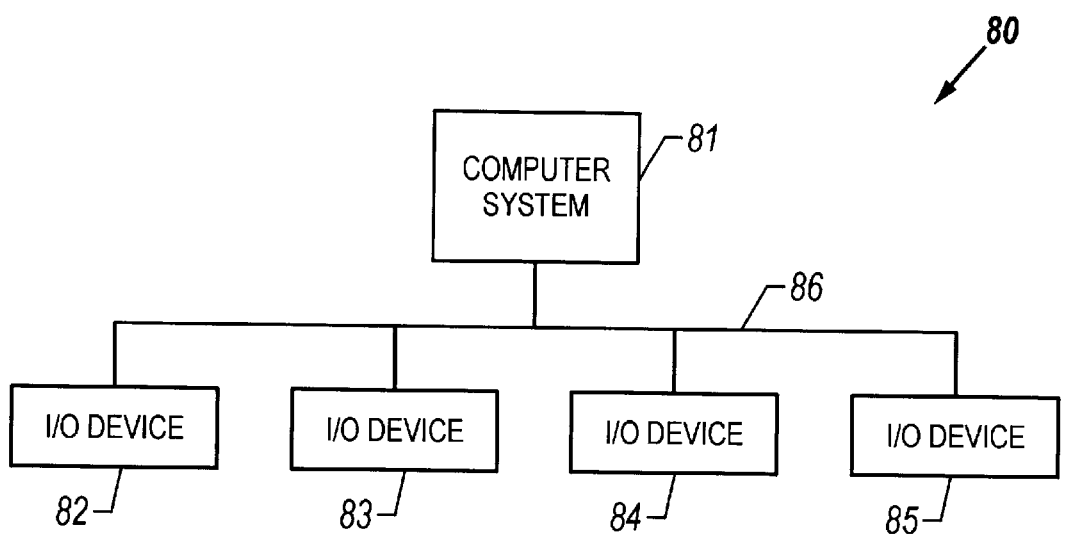
FIG. 16 is a block diagram of a computer system embodying the present invention.

FIG. 16 depicts a computer network 80 which may be used to implement an embodiment of the present invention. Computer system 81, having processing and storage capabilities, is connected to input/output devices 82, 83, 84 and 85 by communication network 86. Input/output devices 82, 83, 84 and 85 may be personal computers used by teachers and administrators to enter information into the database of an embodiment of the present invention or to view reports produced by the computer implementing the illiteracy prevention method. Entered information is stored in the computer system 81, and predictive measures of literacy and aggregated information for reporting purposes are calculated in the computer system 81.

Figure 17:
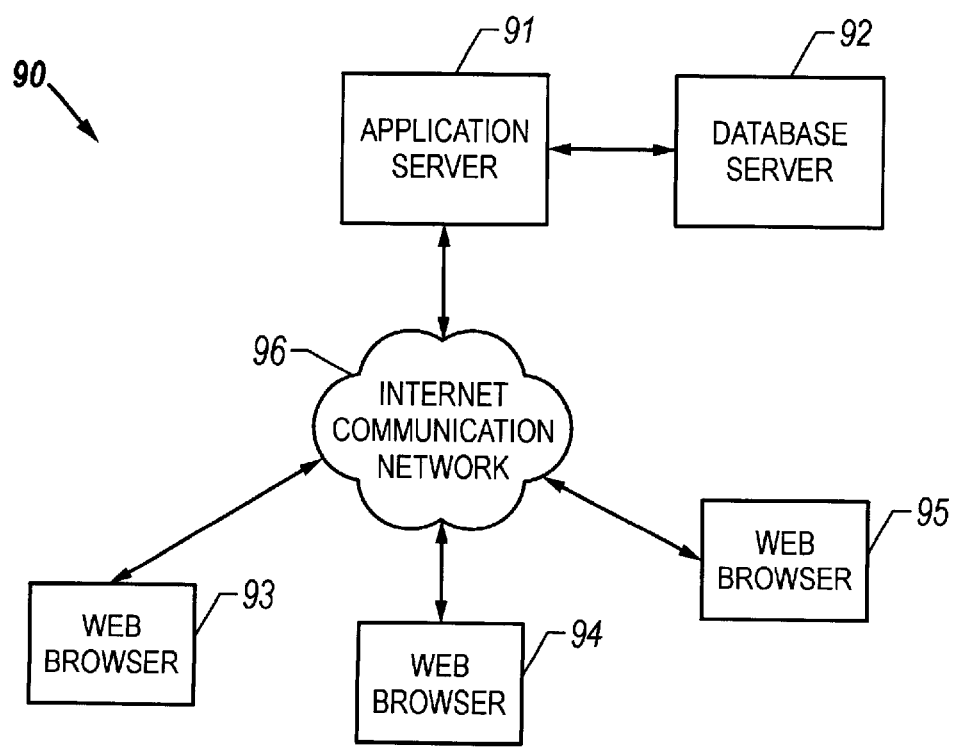
FIG. 17 is a block diagram of an Internet-based computer system embodying the present invention.

FIG. 17 illustrates an alternative embodiment of the present invention. Internet-based computer system 90 includes application server 91 in communication with data base server 92 and with the Internet communication network 96. Web browsers 93, 94 and 95 communicate with the application server 91 via the Internet communication network 96. In this embodiment of the illiteracy prevention method, stored information is kept in data base server 92, calculations required to calculate measures of literacy and to aggregate information for reporting purposes are performed by application server 91. Teachers and supervisors may use web browsers 93, 94 and 95 to input data into the system and to view reports created by the system. In another embodiment, communication network 96 could be an intranet connecting only computers and browsers within the school district.

Figure 18:
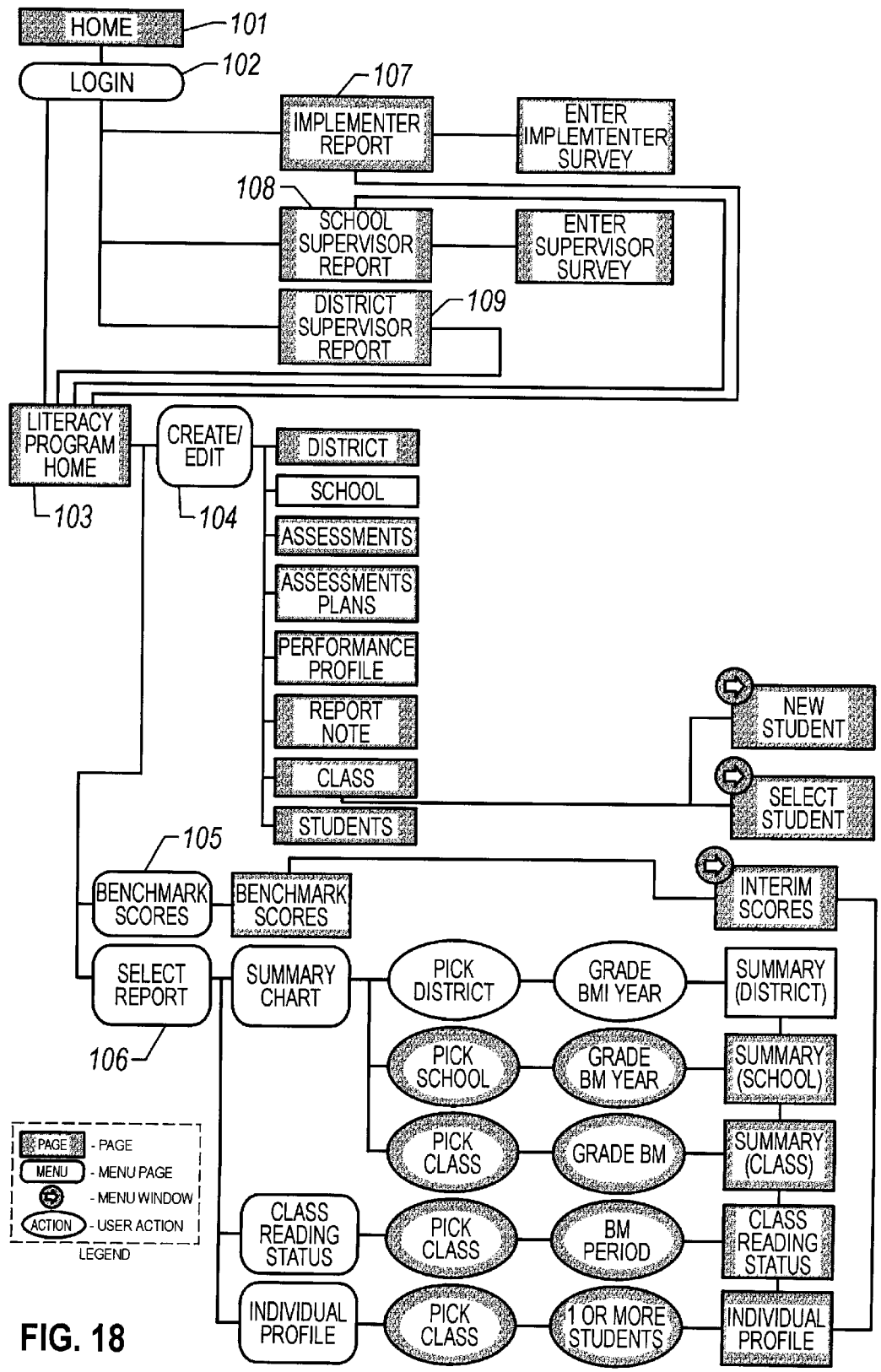
FIG. 18 is a diagram of screens and menu selections used in an embodiment of the present invention.

FIG. 18 depicts some of the screens used by an embodiment of the present invention. From home screen 101 the user can execute login actions 102, which results in access to the literacy program home page 103. From this page the user can execute menu items to access other sections of the literacy program. The Create/Edit menu item 104 may be used to create database entries for the students, classes, schools, and district monitored by the literacy system. The Benchmark Scores menu item 105 may be used to access screens for entering benchmark oral fluency test results and weekly progress test results. The Select Report menu item 106 may be used to view Summary Charts containing aggregated summary information about classes, schools and the school district; Class Reading Status screens presenting information about classes; and Individual Profile screens showing information about individual students. From login actions 102, the user can also access implementer report screen 107, school supervisor report screen 108 and district supervisor report screen 109 and the screens used to enter the survey information that goes into those reports. The user can also access literacy program home page 103 from implementer report screen 107 and school supervisor report screen 108.

This information on student progress and classroom implementation is causally related and is analyzed and correlated to trigger action steps to prevent illiteracy. As such, a method and system for achieving grade-level literacy in substantially all members of a predetermined set of students is described. However, the method may be extended to other subjects, activities, and teaching goals. Further the method may be extended to various grades, classes, and learning levels, among others.

In view of the above detailed description of the present invention and associated drawings, other modifications and variations will now become apparent to those skilled in the art. It should also be apparent that such other modifications and variations may be effected without departing from the spirit and scope of the present invention as set forth in the claims that follow.

What is claimed is:

1. A method for preventing illiteracy and achieving grade-level literacy in substantially all members of a predetermined set of students, comprising the steps of: administering a plurality of standardized oral fluency measures to each student within said set of students; recording a plurality of results from said plurality of standardized oral fluency measures for said each student in a database in a computer system; calculating on said computer system a standardized predictive measure of literacy for said each student, wherein said standardized predictive measure of literacy is a composite of said results stored in said database for said each student; presenting an individual report for said each student on a display in communication with said computer system, said individual report comprising:

said plurality of results for said each student stored in said database;

said standardized predictive measure of literacy for said each student; and recommendations of curriculum and amount of instruction time for said each student, based on said standardized predictive measure of literacy for said each student;

determining a schedule for performing the step of administering for said each student, based on said standardized predictive measure of literacy for said each student; and repeating the steps of administering, recording, calculating, presenting an individual report and determining according to said schedule whereby grade-level literacy is achieved in said substantially all members of said predetermined set of students.

2. The method of claim 1, further comprising the step of presenting an aggregate report on a display in communication with said computer system summarizing said standardized predictive measure of literacy for said predetermined set of students.

3. The method of claim 1, further comprising the step of preparing an aggregate report on a display in communication with said computer system summarizing said standardized predictive measure of literacy for students in a predetermined subset of said predetermined set of students.

4. The method of claim 3, wherein said predetermined set of students is substantially all students in a school district, and said predetermined subset is substantially all students in a class.

5. The method of claim 3, wherein said predetermined set of students is substantially all students in a school district, and said predetermined subset is substantially all students in a school.

6. The method of claim 1, wherein said step of presenting an individual report for said each student further comprises the step of plotting a timeline plot of said results from each of said plurality of standardized oral fluency measures recorded for said each student.

7. The method of claim 6, wherein said step of plotting a timeline plot further comprises indicating a predicted score representing grade-level literacy for each oral fluency test on said plot of said results for said each of said plurality of standardized oral fluency measures.

8. The method of claim 1, further comprising the steps of:
surveying each implementer of said method for implementer information comprising
implementation activities performed by said each implementer in the implementation of the steps of said method;
entering said implementer information into said database in said computer system; and
presenting an implementation report for each said implementer on a display in communication with said computer system comprising a summary of said entered implementer information and recommendations to improve said each implementer's implementation of the steps of said method.

9. The method of claim 8, wherein said implementer information further comprises professional development activities performed by said each implementer.

10. The method of claim 8, further comprising the steps of:
specifying supervisory activities for personnel supervising said each implementer of said method;
surveying each of said personnel for supervisory information comprising said specified supervisory activities performed by said each of said personnel;
entering said supervisory information into said database in said computer system; and
presenting a supervisory report on a display in communication with said computer system comprising a summary of said supervisory information and recommendations of supervisory activities to improve implementation of said method.

11. The method of claim 1, wherein said display communicates with said computer system using the Internet.

12. A system for preventing illiteracy and achieving grade-level literacy in substantially all members of a predetermined set of students, comprising:
a plurality of standardized oral fluency measures;
a computer system, comprising:
a database for storing results of administering said plurality of standardized oral fluency measures to each student within said predetermined set of students;
calculation instructions for calculating a standardized predictive measure of literacy for said each student, wherein said standardized predictive measure of literacy is a composite of said results stored in said database for said each student;
recommendation instructions for recommending curriculum and amount of instruction time for said each student, based on said standardized predictive measure of literacy; and
scheduling instructions for determining a schedule for said each student for the administering of said plurality of standardized oral fluency measures; and
at least one input/output device in communication with said computer system for inputting said results and outputting said results, said measure of literacy, said curriculum and amount of instruction time, and said schedule.

13. The system of claim 12, wherein said computer system further comprises aggregation instructions for aggregating said standardized predictive measure of literacy for said predetermined set of students.

14. The system of claim 12, wherein said computer system further comprises aggregation instructions for aggregating said standardized predictive measure of literacy for a predetermined subset of said predetermined set of students.

15. The system of claim 14, wherein said predetermined set of students is substantially all students in a school district, and said predetermined subset is substantially all students in a class.

16. The system of claim 14, wherein said predetermined set of students is substantially all students in a school district, and said predetermined subset is substantially all students in a school.

17. The system of claim 12, wherein said computer system further comprises plotting instructions for plotting a timeline plot of said results from each of said plurality of standardized oral fluency measures stored in said database for said each student.

18. The system of claim 17, wherein said timeline plot further comprises a score representing grade-level literacy for each of said plurality of standardized oral fluency test.

19. The system of claim 12, further comprising:
an implementer survey form for collecting implementer information comprising implementation activities performed by an implementer utilizing said system;
wherein said database in said computer system further stores said implementer information from said implementer surveys for said implementer utilizing said system for said predetermined set of students; and
wherein said computer system further comprises presentation instructions for presenting an implementation report summarizing said implementer information for said implementer.

20. The system of claim 19, wherein said implementer information further comprises professional development activities performed by said implementer utilizing said system.

21. The system of claim 19, further comprising:
specified supervisory activities for a supervisor supervising said implementer utilizing said system;
a supervisor survey form for collecting supervisory information comprising said specified supervisory activities performed by said supervisor;
wherein said database in said computer system further stores said supervisory information from said supervisor surveys for said supervisor supervising said implementer utilizing said system; and
wherein said computer system further comprises presentation instructions for presenting a supervisory report summarizing said supervisory information for said supervisor.

22. The system of claim 12, wherein said at least one input/output device communicates with said computer system using the Internet.

23. A method for preventing illiteracy and achieving grade-level literacy in substantially all members of a predetermined set of students, comprising the steps of:
administering a plurality of standardized oral fluency measures to each student within said set of students;

recording a plurality of results from said plurality of oral fluency measures for said each student in a database in a computer system;

gathering teacher information from teachers associated with said predetermined set of students, said teacher information comprising implementation activities performed by said teachers in the teaching of said predetermined set of students;

entering said teacher information into said database in said computer system;

specifying supervisory activities for personnel supervising said teachers of said predetermined set of students;

gathering supervisory information from said personnel, said supervisory information comprising said specified supervisory activities performed by said personnel;

entering said supervisory information into said database in said computer system;

calculating on said computer system a standardized predictive measure of literacy for said each student, wherein said standardized predictive measure of literacy is a composite of said results stored in said database for said each student;

presenting an individual report for said each student on a display in communication with said computer system, said individual report comprising:
    said plurality of results for said each student stored in said database;
    said standardized predictive measure of literacy for said each student; and recommendations of curriculum and amount of instruction time for said each student, based on said standardized predictive measure of literacy for said each student;

presenting a teacher report for at least one of said teachers on said display in communication with said computer system, said teacher report comprising a summary of said teacher information and recommendations for improvement of said at least one of said teachers' implementation of said recommendations;

presenting a supervisory report on said display in communication with said computer system, said supervisory report comprising a summary of said supervisory information and recommendations of supervisory activities for improvement of the implementation of said method;

determining a schedule for said each student, for performing the steps of administering, calculating, and determining a schedule, based on said measure of literacy for said each student;

repeating the steps of administering, calculating, and determining according to said schedule;

repeating the steps of gathering said teacher information, entering said teacher information, gathering said supervisory information, entering said supervisory information, presenting said implementation report, and presenting said supervisory report.

24. A system for preventing illiteracy and achieving grade-level literacy in substantially all members of a predetermined set of students, comprising:
    a plurality of standardized oral fluency measures;
    a teacher survey form for collecting teacher information comprising activities performed by a teacher utilizing said system;
    specified supervisory activities for a supervisors supervising said teacher utilizing said system;
    a supervisor survey form for collecting supervisory information comprising said specified supervisory activities performed by said supervisor;
    a computer system, comprising:
        a database for storing results of administering said plurality of measures to each student in said predetermined set of students,
        said teacher information from said teacher survey for said teacher utilizing said system for said predetermined set of students;
        said supervisory information from said supervisor surveys for said supervisor supervising said teacher utilizing said system;
        calculation instructions for calculating a standardized predictive measure of literacy for said each student, wherein said standardized predictive measure of literacy is a composite of said results stored in said database for said each student;
        recommendation instructions for recommending curriculum and amount of instruction time for said each student, based on said standardized predictive measure of literacy;
        presentation instructions for presenting a teacher report summarizing said teacher information for said teacher;
        presentation instructions for presenting a supervisory report summarizing said supervisory information for said supervisor; and
        scheduling instructions for determining a schedule for said each student for the administering of said plurality of standardized oral fluency measures; and
    at least one input/output device in communication with said computer system for inputting said results and outputting said results, said standardized predictive measure of literacy, said curriculum and instruction time, and said schedule.

25. The system of claim 24, wherein said computer system comprises a first and second databases, said first database storing said results of administering said plurality of standardized oral fluency measures, and said second database storing said teacher information and said supervisory information.

* * * * *

UNITED STATES PATENT AND TRADEMARK OFFICE
CERTIFICATE OF CORRECTION

PATENT NO. : 6,676,413 B1
DATED : January 13, 2004
INVENTOR(S) : Emery Randolph Best et al.

It is certified that error appears in the above-identified patent and that said Letters Patent is hereby corrected as shown below:

Column 1,
Line 44, cancel "irradiate" and insert -- eradicate --

Signed and Sealed this

Twentieth Day of July, 2004

JON W. DUDAS
*Acting Director of the United States Patent and Trademark Office*